United States Patent [19]

Taylor

[11] 4,113,638

[45] Sep. 12, 1978

[54] FROTHING COMPOSITION FOR GYPSUM DISPERSIONS

[75] Inventor: Robert Coleman Taylor, King of Prussia, Pa.

[73] Assignee: Atlantic Richfield Company, Los Angeles, Calif.

[21] Appl. No.: 711,761

[22] Filed: Aug. 4, 1976

[51] Int. Cl.$^2$ .............................................. C09K 3/00
[52] U.S. Cl. ...................................... 252/61; 252/60; 252/549; 252/551; 252/552; 106/88; 106/111
[58] Field of Search ................ 106/88, 111, 112, 113, 106/114, 115, 116; 252/549, 551, 552, 553, 61, 60

[56] References Cited

U.S. PATENT DOCUMENTS

| | | | |
|---|---|---|---|
| 2,318,574 | 5/1943 | Harter | 106/111 |
| 3,231,504 | 1/1966 | Marion et al. | 252/551 |
| 3,372,040 | 3/1968 | Ware | 106/111 |
| 3,577,248 | 5/1971 | Doan et al. | 106/111 |
| 3,725,090 | 4/1973 | Lyass et al. | 106/111 |
| 3,912,528 | 10/1975 | Doan et al. | 106/111 |
| 3,926,650 | 12/1975 | Lange et al. | 106/111 |

OTHER PUBLICATIONS

"Kirk–Othmer Encyclopedia of Chemical Technology", John Wiley & Sons, Inc., 2nd edition, vol. 19, pp. 507–532.

*Primary Examiner*—L. Dewayne Rutledge
*Assistant Examiner*—John P. Sheehan
*Attorney, Agent, or Firm*—Coleman R. Reap

[57] ABSTRACT

An improved gypsum dispersion frothing composition is presented comprised of a first component which is a neutralized sulfonic acid or neutralized sulfuric acid ester and a second component which is a neutralized dipropyl benzene sulfonate or a mixture of neutralized alkyl benzene sulfonates containing at least 50% neutralized dipropyl benzene sulfonate. The preferred member of the first component is neutralized alkyl benzene sulfonates having 10 to 14 alkyl carbon atoms, and the preferred second component is neutralized diisopropyl benzene sulfonate. The preferred neutralizing agents are sodium, ammonium ion, or triethanolamine. The frothing composition is preferably used at a concentration of 0.01 to 0.1 parts per 100 parts of gypsum.

13 Claims, No Drawings

FROTHING COMPOSITION FOR GYPSUM DISPERSIONS

BACKGROUND OF THE INVENTION

This invention relates to the preparation of gypsum board and more particularly to improved frothing composition for use in the gypsum dispersions used to make the gypsum board.

In the production of gypsum board a fluid gypsum dispersion is spread between two water impervious barriers such as paper sheet and the resultant composition is heated until the free water has evaporated and the gypsum has set. Because of the weight of gypsum it has become the practice in the industry to incorporate air bubbles into the gypsum core to lower the density of the finished gypsum product. This is accomplished by incorporating a froth or foam into the dispersion prior to the evaporation of water. The froth has been conventionally prepared by agitating an aqueous solution of a frothing agent or composition such as rosin soap. Attempts have been made to utilize in commercial gypsum board manufacturing operations synthetic surfactants such as neutralized sulfonic acids and neutralized sulfuric acid esters. Although these surfactants have been successfully used as detergents in other fields such as in the preparation of dishwshing and clothes washing products, it has been found that the amount and stability of the foam generated by these frothing agents in gypsum slurries was not sufficient to insure uniform low density throughout the gypsum board product. Since neutralized sulfonic acids and sulfuric acid esters are inexpensive and readily available, it would be desirable to use these materials in the manufacture of gypsum board.

U.S. Pat. No. 3,577,248 discloses the use of linear alkyl benzene sulfonates having 8.5 to 10.5 alkyl carbon atoms. This patent also discloses mixtures of sodium xylene sulfonate and $C_{10}$ to $C_{13}$ linear alkyl benzene sulfonates and mixtures of $C_6$ to $C_7$ linear alkyl benzene sulfonates with $C_{10}$–$C_{13}$ linear alkyl benzene sulfonates. U.S. Pat. No. 3,512,528 discloses the use of combinations of linear alkyl benzene sulfonates having average alkyl carbon contents of 6 to 15 carbon atoms with certain alcohols, glycols, esters, or ketones.

SUMMARY OF THE INVENTION

A new gypsum dispersion frothing composition has now been developed containing large amounts of neutralized alkyl benzene sulfonic acids or sulfuric acid esters. Accordingly, it is an object of the invention to present improved gypsum dispersions. It is another object of the invention to present improved gypsum dispersion frothing compositions. It is another object of the invention to present gypsum dispersion frothing compositions containing large amounts of neutralized sulfonic acid or sulfuric acid esters. It is another object of the invention to present gypsum dispersion frothing compositions having excellent foam generation and stability properties which frothing compositions contain large amounts of neutralized alkyl benzene sulfonic acids. These and other objects of the invention will become apparent from the description and examples.

In accordance with the invention the improved gypsum dispersion frothing compositions are comprised of two essential components. The first component, present in an amount of about 50 to 95% based on the total weight of both components, is a sulfonic acid or sulfuric acid ester which is neutralized with a base, preferably with sodium hydroxide, ammonium hydroxide or triethanolamine. The second component, present in an amount of 5 to 50% based on the total weight of both components, is a neutralized dipropyl benzene sulfonic acid or a mixture of mono- and polyalkyl benzene sulfonic acids containing at least 50% by weight of dipropyl benzene sulfonic acid and having an average alkyl carbon content of about 4.5 to 8 atoms per molecule. The neutralizing agents used in the second component can be any of those used in the preparation of the first component. The second component is preferably either substantially all neutralized dipropyl benzene sulfonic acid, most preferably neutralized diisopropyl benzene sulfonic acid, or a mixture containing at least 50% by weight neutralized diisopropyl benzene sulfonic acid having an average alkyl carbon content of 5.5 to 6.5 atoms per molecule.

DESCRIPTION OF THE INVENTION

The sulfonic acids which can be neutralized and used as the first component of the frothing composition include certain alkyl benzene sulfonic acids, alkyl or paraffin sulfonic acids and α-olefin sulfonic acids. The alkyl benzene sulfonic acids which can be utilized in the preparation of the alkyl benzene sulfonates used in the practice of this invention have the following structural formula

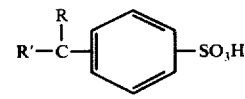

wherein R and R' are linear alkyl radicals and the average carbon content of the sum of R and R' ranges from 9 to 13 and preferably from 10 to 11 carbon atoms. In other words, the linear alkyl group represented by RCR' contains from 10 to 14 and preferably from 11 to 12 carbon atoms. Typical useful alkyl benzene sulfonic acids include decyl benzene sulfonic acid dodecyl benzene sulfonic acid, etc. Commercial alkyl benzene sulfonic acids are often a mixture of several alkyl benzene sulfonic acids. For example, commercial dodecyl benzene sulfonic acids often contain 10 to 14 carbon atoms with an average carbon content of about 11.5 atoms per alkyl group. These compounds are especially suitable for use in preparing the first component of the frothing composition.

The above alkyl benzene sulfonates can be prepared by subjecting a linear olefin or a secondary linear alkyl chloride or alcohol and benzene to an alkylation environment in the presence of an alkylation catalyst such as $AlCl_3$, HF, $H_2SO_4$ or $BF_3$. The alkylated benzene can then be sulfonated utilizing reagents such as sulfuric acid, sulfur trioxide or oleum.

The alkyl sulfonic acids, more commonly called paraffin sulfonic acids, which can be utilized in preparing sulfonates useful as the first component of the invention are those made by sulfonating straight or branched chain alkanes having 14 to 20 and preferably 15 to 18 carbon atoms per molecule by reacting the paraffin with sulfur dioxide and oxygen. Particularly useful paraffin sulfonic acids are those made from n-paraffins derived from kerosene petroleum fractions. Typical useful paraffin sulfonic acids include tetradecyl sulfonic acid, heptadecyl sulfonic acid, 2-methylpentadecyl sulfonic acid, etc.

The alpha-olefin sulfonic acids which can be used are those in which the alkene group is linear and has about 12 to 20 carbon atoms and preferably about 14-18 carbon atoms. These sulfonic acids are usually prepared by reacting a linear alpha-olefin with sulfur trioxide and the product usually contains, in addition to the alpha-olefin sulfonic acid, an hydroxylalkyl sulfonic acid. The ethylenic group may be at any position in the alkenyl chain. Typical alpha-olefin sulfonic acids include tetradecenyl sulfonic acid, hexadecenyl sulfonic acid, eicosenyl sulfonic acid, etc.

The sulfuric acid esters which can be utilized in the preparation of the neutralized sulfuric acid esters useful as the first component of the frothing composition include primary and secondary alkyl sulfuric acid esters and sulfuric acid esters of polyether nonionics. Useful primary alkyl sulfuric acid esters are those in which the alkyl group contains about 12 to 20 and preferably 14 to 18 carbon atoms with predominantly linear alkyl groups preferred. These compounds can be prepared by the reaction of a primary alcohol with sulfur trioxide and usually consists of compounds having a range of carbon atoms and may contain a mixture of isomers. Typical primary alkyl sulfates include: n-tetradecyl alcohol sulfate, n-hexadecyl alcohol sulfate, tallow alcohol sulfate, tridecyl oxo alcohol sulfate, mixed n-primary and 2-methyl and 2-ethyl isomers of $C_{16}$ to $C_{18}$ alcohol sulfates, etc.

Secondary alkyl sulfuric acid esters useful in the preparation of the first component of the frothing composition are those in which the alkyl group contains about 12 to 20 and preferably about 14 to 18 carbon atoms. These compounds are generally prepared by the direct reaction of an olefin with sulfuric acid and usually consist of a mixture of isomeric sulfuric acid esters, i.e., the sulfuric acid radical is attached to various carbon atoms in the chain. Typical secondary alkyl sulfuric acid esters include 2-tetradecyl sulfate, 3-hexadecyl sulfate, mixed secondary esters of $C_{16}$ to $C_{18}$ secondary alcohols, etc.

Alkylphenol polyoxyalkylene sulfates useful in preparing compounds suitable for use as the first component of the frothing composition are those in which the alkylphenol group contains 8 to 12 and preferably 9 to 12 carbon atoms and the polyoxyalkylene portion comprises about 30 to 50% and preferably about 35 to 45% alkylene oxide, based on the total weight of the compound prior to sulfation. These compounds can be made by alkylating phenol, reacting the alkylphenol with alkylene oxide and sulfating the resulting product. Preferred alkylene oxides are ethylene oxide and propylene oxide and mixtures of these. Suitable alkylphenol sulfates include nonylphenol tetraethylene oxide sulfate, dodecylphenol tripropylene oxide sulfate, etc.

Alkylpolyoxyalkylene sulfuric acid esters useful in preparing the first component of the frothing composition are those in which the alkyl portion of the compound contains 12 to 20 and preferably 12 to 16 carbon atoms and the polyoxyalkylene portion comprises about 30 to 50% and preferably about 35 to 45% alkylene oxide, based on the total weight of the compound prior to sulfation. These compounds are prepared by reacting alkyl alcohols with alkylene oxides and sulfating the resulting product. As above, preferred alkylene oxides are ethylene oxide and propylene oxide and mixture of these. Suitable alkylpolyoxyalkylene sulfates include dodecyl tetraoxyethylene sulfate, hexadecyl trioxypropylene sulfate, octadecyl tetraoxyethylene sulfate, etc.

The sulfonic acids or sulfuric acid esters used in the first component can be neutralized by reaction with any of the bases usually used for neutralization of sulfonic acids or sulfuric acid esters intended for use as surfactants. Suitable bases include the hydroxides, oxides, carbonates or bicarbonates of sodium, potassium, lithium, ammonium ion, magnesium, or mixtures of these. The sulfonic acid or sulfuric acid ester can also be neutralized with monoethanolamine, diethanolamine or triethanolamine. The preferred neutralizing agents are sodium hydroxide, ammonium hydroxide and triethanolamine.

The second component of the gypsum dispersion frothing composition of the invention is neutralized dipropyl benzene acid or a mixture of neutralized mono- and polyalkyl sulfonates containing at least 50% by weight neutralized dipropyl benzene sulfonic acid and having an average alkyl carbon atom content of 4.5 to 8 and preferably 5.5. to 6.5 atoms per molecule. The propyl groups are preferably isopropyl groups and they may be in ortho, meta or para positions or combinations of these. When the second component is a mixture of neutralized dipropyl benzene sulfonic acids and other neutralized alkyl benzene sulfonic acids the mixture may contain up to 50% by weight neutralized monopropyl benzene sulfonic acid. In other words, the frothing composition of the invention may be comprised of equal weight amounts of neutralized mono- and dipropyl benzene sulfonic acids, in which case the average alkyl carbon content would be about 4.5 atoms per molecule. On the other hand, mixtures of neutralized alkyl benzene sulfonic acids used as the second component of the frothing composition may contain, in addition to the 50 weight % neutralized dipropyl benzene sulfonic acid, up to about 40% by weight of neutralized tripropyl benzene sulfonic acid, the balance of neutralized alkyl benzene sulfonic acids in the mixture preferably being such that the maximum average alkyl carbon content does not exceed about 6.5 atoms per molecule. It is preferred that the maximum neutralized tripropyl benzene sulfonic acid content in the mixture be limited to about 25% by weight. A material which is particularly suitable for use as the second component of the frothing compositions when neutralized and sulfonated is the cumene distillation bottoms obtained during the preparation of cumene. This material contains a high diisopropyl benzene content and an average alkyl carbon atom content of about 6.0 to 6.8.

The alkyl benzene sulfonic acids can be neutralized with the same bases and alcohol amines as the first component sulfonic acids or sulfuric acid esters. The first and second frothing composition components can be prepared separately or they can be cosulfonated and/or coneutralized.

The frothing composition generally contains about 50 to 95 parts of weight of the first component and about 5 to 50 parts by weight of the second component and preferably contains about 70 to 90 parts by weight of the first component and about 10 to 30 parts by weight of the second component.

The frothing composition may contain additional components such as builders or stabilizers to enhance or modify its frothing and other properties. The amount of active components in typical aqueous solutions or slurries of the frothing composition varies from about 25 to 65% by weight, the balance being water. These slurries may, if desired, be dried to a flake or powder and used as such. The frothing composition, depending upon the percent of the various components, can be a clear heterogenous solution or a pumpable slurry; and in either situation, the frothing effect upon the gypsum is beneficial when compared to that of known frothing agents.

The frothing composition of the invention can be used to make gypsum dispersions according to the following procedure. Gypsum is added to water with agitation. The amount of water included will vary depending upon the type of gypsum used and the strength and density properties desired in the finished product. Generally, the water ranges from 60 to 130 parts by weight per 100 parts gypsum. A froth can be generated in the dispersion by adding the frothing composition of this invention to the dispersion and agitating the resulting mixture until the desired level of foam is produced. Alternatively, and preferably, the foam can be first prepared from the frothing composition in water and then added to the gypsum dispersion. The amount of frothing composition utilized will vary from the minimum amount effective to produce the desired product up to about 1 part per 100 parts of gypsum. The minimum amount usable will depend upon the type of gypsum being used, the hardness of the water and the specific foaming properties of the frothing composition. For most commercial operations the amount of total frothing composition required to produce the desired result varies from about 0.001 to 1 part per 100 parts gypsum. Optimum loadings are usually in the range of about 0.01 to 0.1 part per 100 parts gypsum.

Gypsum board can be made using the frothing composition of the invention by depositing a gypsum dispersion containing the frothing composition between two barriers such as paper sheets and subjecting the sandwiched dispersion to heat, usually at about 250° to 350° F, sufficiently long to evaporate the water and allow the gypsum to set. Various commercial methods of producing gypsum board are well-known in the art as exemplified by U.S. Pat. Nos. 2,560,521; 2,432,963; 2,207,339; and 3,343,818; all of which are incorporated herein by reference.

Various additives can be added to the dispersion to aid in the setting. For example, accelerators such as ground gypsum, potassium sulfate or ammonium sulfate can be added to improve setting rates. Additives such as starch or glue can be added to retard setting at the surface of barriers and thus provide a better core-to-barrier bond. Structural elements such as fibers or ground paper can also be incorporated to alter the strength characteristics of the final board. Most additives are utilized in amounts ranging from 0.1 to 2 parts per 100 parts gypsum.

The following examples illustrate specific embodiments of the invention. Unless otherwise indicated parts and percentages are on a weight basis.

EXAMPLE I

Water having a hardness of 500 ppm is prepared by adding magnesium chloride and calcium chloride to tap water. Sufficient quantities of an aqueous solution of sodium linear alkyl benzene sulfonate frothing agent having an average of 11.3 alkyl carbon atoms and gypsum are added to the hard water to provide frothing agent and gypsum concentrations of 0.062% and 5%, respectively, and the temperature of the resulting mixture is adjusted to 40° F. The mixture is agitated vigorously for two minutes. The agitation is stopped and the volume of foam generated is measured. The foamed mixture is permitted to stand for five minutes and the amount of foam drainage is measured. The results are recorded in Table I.

EXAMPLE II

The procedure of Example I is repeated except that the frothing agent is replaced by an equal amount of a mixture comprised of 83% by weight of the sodium linear alkyl benzene sulfonate used in Example I and 17% by weight of sodium xylene sulfonate. The foam generation level and drainage are measured as in Example I and the results are recorded in Table I.

EXAMPLE III

The procedure of Example I is repeated except that the frothing agent is replaced by an equal amount of a mixture comprised of 79% by weight of the sodium linear alkyl benzene sulfonate used in Example I and 21% of the sodium salt of the sulfonated bottoms from a cumene distillation tower having a composition before sulfonation of 87.1% by weight diisopropyl benzene, 9.2% by weight triisopropyl benzene, and 1.5% by weight tetraisopropyl benzene, the residue being comprised of cumene and mixed higher cumene derivatives. The foam generation level and drainage are measured as in Example I and the results are recorded in Table I.

TABLE I

| Example | Frothing Agent | Foam Generated ml | Foam Drainage ml |
|---|---|---|---|
| I | sodium alkyl benzene sulfonate | 300 | 158 |
| II | 83% sodium alkyl benzene sulfonate 17% sodium xylene sulfonate | 300 | 159 |
| III | 79% sodium alkyl benzene sulfonate 21% sodium salt of sulfonated cumene bottoms | 650 | 72 |

Table I illustrates the advantages of using the frothing composition of the invention. In Example III in which the frothing composition of the invention is used the amount of foam generated after two minutes of agitation of the gypsum slurry is 650 ml whereas in Examples I and II in which conventional frothing agents are used the amount of foam generated is only 300 ml. Furthermore, when the generated foams are permitted to stand for five minutes only 72 ml of the foam generated in Example III drained, whereas 158 and 159 mls, respectively, of the Example I and Example II foams drained away.

EXAMPLE IV

The procedure of Example I is repeated except that the frothing agent is replaced by an equal amount of a mixture comprised of 15 parts by weight of diisopropyl benzene sulfonate and 85 parts by weight of the sodium alkyl benzene sulfonate used in Example I. The resulting gypsum slurry will have a high rate of foam generation and a low foam drainage rate.

EXAMPLE V

The procedure of Example I is repeated except that the frothing agent is replaced with an equal amount of a mixture comprised of 25 parts by weight of the sodium salt of the sulfonated cumene bottoms described in Example III and 75 parts by weight of ammonium tetradecyl alcohol sulfate. The resulting gypsum slurry will have a high rate of foam generation and a low rate of foam drainage.

EXAMPLE VI

The procedure of Example I is repeated except that the frothing agent is replaced with an equal amount of a mixture comprised of 20 parts by weight of the triethanolamine salt of diisopropyl benzene sulfonate and 80 parts by weight of potassium tetradecyl alcohol triethoxy sulfate. The resulting gypsum slurry will have a high rate of foam generation and a low rate of foam drainage.

EXAMPLE VII

The procedure of Example I is repeated except that the frothing agent is replaced with an equal amount of a mixture comprised of 15 parts by weight of the ammonium salt of the sulfonated cumene bottoms described in Example III and 85 parts by weight of sodium hexadecene-1 sulfonate. The resulting gypsum slurry will have a high rate of foam generation and a low rate of foam drainage.

Examples IV to VII illustrate additional embodiments of the invention.

Although the invention has been described with particular reference to specific examples it is understood that the scope of the invention is not limited thereto but is only limited by the breadth of the appended claims.

I claim:

1. A frothing composition useful for preparing aqueous gypsum dispersions comprising:
   (a) about 50 to 95 parts by weight of a first component which is a neutralized alkylaryl sulfonic acid having an average of about 10 to 14 alkyl carbon atoms, and
   (b) about 5 to 50 parts by weight of a second component which is a neutralized dipropyl benzene sulfonic acid or a mixture of neutralized alkylbenzene sulfonic acids containing at least 50% by weight of neutralized dipropyl benzene sulfonic acid and having an average alkyl carbon content of about 4.5 to 8 atoms per molecule.

2. The frothing composition of claim 1 wherein the first and second components are salts of sodium, potassium, lithium, ammonia, magnesium, monoethanolamine, diethanolamine, triethanolamine or mixtures of these.

3. The frothing composition of claim 2 wherein said first component is a sodium, ammonium, or triethanolamine salt of an alkyl benzene sulfonic acid containing 10 to 14 alkyl carbon atoms.

4. The frothing composition of claim 3 wherein said neutralized dipropyl benzene sulfonic acid is a sodium, ammonium or triethanolamine salt of diisopropyl benzene sulfonic acid.

5. The frothing composition of claim 4 wherein said first component is the sodium, ammonium or triethanolamine salt of alkyl benzene sulfonic acid having an average alkyl carbon content of about 11 to 12 atoms per molecule.

6. The frothing composition of claim 4 wherein said second component is the sodium, ammonium, or triethanolamine salt of sulfonated cumene distillation residue.

7. The frothing composition of claim 4 wherein said first and second components are present in amounts of about 75 to 95 parts by weight and 5 to 25 parts by weight, respectively.

8. The frothing composition of claim 4 wherein second component is the sodium, ammonium, or triethanolamine salt of diisopropyl benzene sulfonic acid.

9. The frothing composition of claim 1 containing water in an amount up to about 75% based on the total weight of the frothing composition.

10. A frothed gypsum dispersion containing as the frothing agent the composition of claim 3.

11. A frothed gypsum dispersion containing as the frothing agent the composition of claim 4.

12. A frothed gypsum dispersion containing as the frothing agent the composition of claim 6.

13. A frothed gypsum dispersion containing as the frothing agent the composition of claim 8.

* * * * *